United States Patent [19]
Champetier

[11] Patent Number: 4,861,445
[45] Date of Patent: Aug. 29, 1989

[54] BARRIER FOR MOLECULAR CONTAMINATES

[75] Inventor: Robert J. Champetier, San Pedro, Calif.

[73] Assignee: Hughes Aircraft Company, Los Angeles, Calif.

[21] Appl. No.: 137,639

[22] Filed: Dec. 24, 1987

[51] Int. Cl.[4] .......................... B01J 19/08; B64G 1/46
[52] U.S. Cl. .............................. 204/157.3; 204/157.44; 204/157.63; 204/193; 422/186; 244/163
[58] Field of Search ........... 204/157.15, 157.3, 157.44, 204/157.63, 158.2, 158.21, 193; 422/186, 22; 244/163

[56] References Cited

U.S. PATENT DOCUMENTS

| | | | |
|---|---|---|---|
| 3,105,024 | 9/1963 | Schutz | 204/157.44 |
| 3,560,363 | 2/1971 | Goetz | 204/157.3 |
| 3,997,415 | 12/1976 | Machi | 204/157.44 |
| 4,507,265 | 3/1985 | Hipo | 204/157.3 |

OTHER PUBLICATIONS

Collinson et al, Chemical Reviews, vol. 56, Jun. 1956, pp. 477–483, 517–523.

Lind et al, Journal of American Chemical Society, 48, 1926, pp. 2335–2347.

*Primary Examiner*—John F. Niebling
*Assistant Examiner*—Ben C. Hsing
*Attorney, Agent, or Firm*—William J. Streeter; A. W. Karambelas

[57] ABSTRACT

Apparatus and method for preventing the escape of contaminates outgassing from polymer materials within an enclosure. In an illustrative embodiment the invention provides an exhaust path for an electronic enclosure 10 containing polymeric materials (12,14). The exhaust path comprises a tubular member 16 which permits the atmospheric gases within the enclosure to escape from the enclosure during liftoff. Within the member are at least one region 26 containing an ionizing source, such as a radioactive substance which emits alpha particles. These alpha particles are relatively low energy particles and are stopped by a relatively thin layer of material. The radiation polymerizes, into a solid surface film 30 outgassing molecular species 28 as they traverse the inner region of the member. The use of the invention provides for permitting the atmospheric gasses within the enclosure to escape the enclosure during the initial ascent and, further, serves as a pathway and removal device for molecular contaminates.

12 Claims, 1 Drawing Sheet

BARRIER FOR MOLECULAR CONTAMINATES

FIELD OF THE INVENTION

The present invention relates to a barrier for molecular contaminants and, in particular, to an apparatus and method for substantially eliminating the outgassing of molecular contaminants from a spacecraft.

BACKGROUND

The degrading effect of molecular contaminates in spacecraft has been well characterized. Molecules of hydrocarbon or plasticizer or other heavy molecular species are outgassed under vacuum conditions by polymeric components. Sources of these molecular contaminants can be paints, adhesives, or insulators. Such contaminants may also be outgassed from potting compounds, conformal coatings on printed circuit boards or the like and from other polymer compounds found inside electronic assemblies.

Such electronic assemblies are usually contained within an enclosure which is, typically, not hermetically sealed. The outgassing process may continue for years in the vacuum of space.

As an example, the contaminants outgassing from electronic components within a spacecraft will exit from the polymers into a surrounding electronic enclosure. The molecules will remain within the enclosure until they encounter an orifice whereby they exit into the inside volume of the spacecraft. The molecules will transfer from surface to surface within the volume of the spacecraft until they exit through a gap or orifice within the outer shell of the spacecraft. Some portion of these molecules may then impinge on a thermally sensitive exterior surface of the spacecraft, where some fraction of these molecules will adhere. Subsequent exposure to the sun and other ionizing radiation within space may cause a darkening of this molecular deposit, resulting in a gradual increase in temperature. Over a period of time, such areas develop into "hot spots" which may adversely affect the operation and/or the useable lifetime of the craft.

Spacecraft designers have only a limited means of controlling this outgassing process, such as by controlling the venting paths and directions of the molecules from the spacecraft. It is typically not practical or economical to totally reengineer the electronic enclosure assemblies themselves. However, this process of venting the molecules towards favorable directions does not completely solve the problem of contaminate deposits on the external surface of the spacecraft.

It is also known to treat the polymeric components themselves to substantially reduce the degree of outgassing. However, this approach is not a practical nor cost effective approach, and is only implemented in rare circumstances. In particular, it is not typically performed for electronic enclosures and assemblies, which are a major source of contaminates. For example, approximately fifteen percent of the total weight of a spacecraft may be made up of electronics-related polymeric materials. These materials are capable of outgassing contaminates into the spacecraft for years.

It is also not practical to hermetically seal the electronic enclosures, in that the resultant enclosure would need to be structurally reinforced in order to maintain a pressure of one atmosphere following liftoff of the spacecraft. The resultant "pressure vessel" structure would be substantially heavier than a nonhermetically sealed enclosure. This extra weight may result in a payload which is prohibitively expensive or technically impossible to place into orbit.

SUMMARY OF THE INVENTION

The foregoing problems are solved and other advantages are realized by the use of the apparatus and method of the invention which controls the escape of molecular contaminates outgassing from polymer material within a spacecraft by providing an exhaust path for an electronic enclosure which also acts as a barrier to contaminate molecules. Such an exhaust path may comprise a tubular member which permits the air within the enclosure to escape from the enclosure during liftoff. Within the member are a plurality of regions containing an ionizing source, such as a radioactive substance which emits alpha particles. These alpha particles are relatively low energy particles and are stopped by a relatively thin layer of material. The particles polymerize the outgassing molecular species, as they traverse the member, into a solid surface film within the member. The use of the invention therefore provides for permitting the atmospheric gasses within the enclosure to escape from the enclosure during the initial ascent and, further, serves as a pathway and removal means for molecular contaminates.

BRIEF DESCRIPTION OF THE DRAWINGS

The foregoing aspects and other features of the invention are explained in the following description, taken in connection with the accompanying drawings wherein.

DETAILED DESCRIPTION

Figure 1:
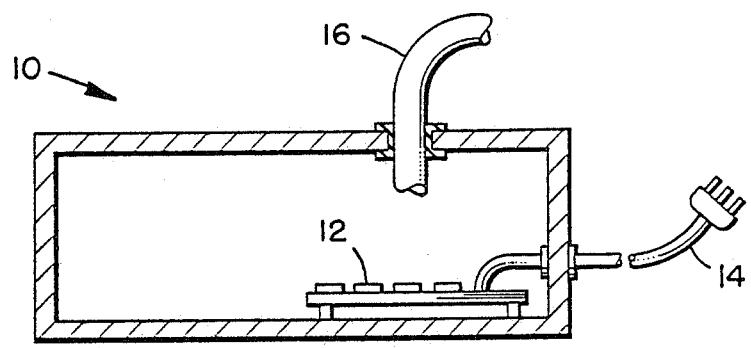
FIG. 1 is an illustrative cross-sectional view of an electronic enclosure having one embodiment of the invention.

With reference to FIG. 1 there is shown an electronic enclosure 10 having a circuit board 12 mounted within. Although one circuit board 12 is shown in FIG. 1 it is understood that such an electronic enclosure 10 may contain a plurality of such circuit boards and/or other types of electronic devices. Enclosure 10 is further typically provided with a cable assembly 14 which is operable for bringing power to and electronic signals to and from the circuit board 12. Enclosure 10, in accordance with the invention, is provided with a tubular member, or exhaust tube 16, for exhausting the atmospheric gases within the enclosure during the initial ascent of a spacecraft.

In order that all exhausting air and contaminate particles, such as outgassed molecules, exit the enclosure 10 in a controlled manner, that is through the exhaust tube 16, enclosure 10 is designed to be sealed to prevent the escape of air and contaminate molecules in an uncontrolled manner through other gaps or orifices.

As has been previously mentioned electronic assemblies such as the circuit board 12, the insulation found within cable assembly 14 and also potting compounds used on various electronic devices within the enclosure 10 are all a source of contaminate molecules. In the vacuum of space these molecules will outgas from these polymer materials. In order to prevent these outgassing molecules from finding their way out of the spacecraft and being deposited upon heat sensitive, external surfaces of the spacecraft, the exhaust tube 16 is constructed as shown in FIG. 2.

Figure 2:
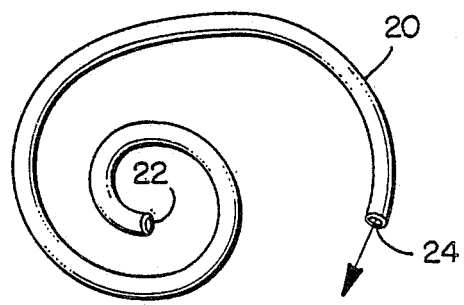
FIG. 2 is a view of an electronic enclosure exhaust tube constructed in accordance with one embodiment of the invention.

Referring now to FIG. 2 it may be seen that an exhaust tube 20 has an enclosure exhaust port 22 for connection to the electronic enclosure 10. The opposing end of exhaust tube 20 comprises an exhaust port 24 for exhausting the escaping air in a predetermined direction. The dimensions of tube 20 are selected such that the volume of air contained within enclosure 10 may be exhausted during liftoff at a rate which is sufficient to prevent an overpressure from developing within the enclosure and a resulting damage or cracking of the enclosure 10. As has been previously discussed, during normal operation of the spacecraft in the vacuum of space the various hydrocarbon and other polymeric molecules which may be outgassed from the various polymer coatings and components within the enclosure will also exit the enclosure 10 through the tube 20. To prevent these contaminates from finding their way to the heat sensitive external surfaces of the spacecraft the tube 20 is provided, in accordance with the invention, with at least one region comprised of a source of ionizing radiation. The region may be formed as alpha particle emitting coatings disposed within the inner walls of the tube 20.

Figure 3:
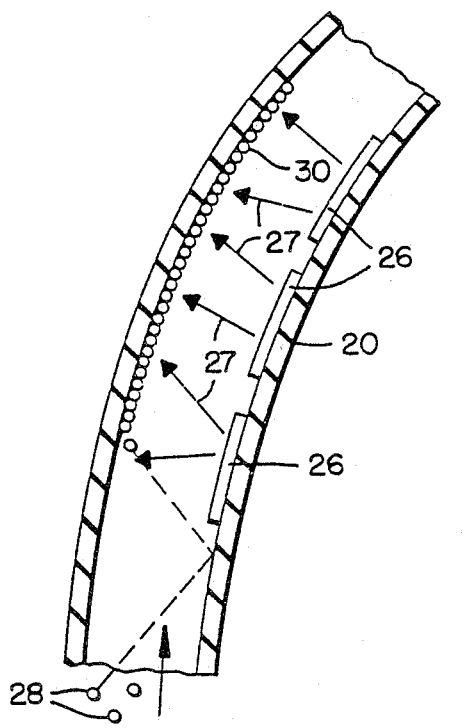
FIG. 3 is cross-sectional view of a portion of the exhaust tube of FIG. 2 showing the placement of the alpha particle emitting coatings within the tube.

Referring now to FIG. 3 there is shown in cross section a portion of the tube 20 of FIG. 2 wherein it can be seen that a plurality of alpha particle emitting coatings 26 are disposed along the inner surface of the tube 20. A contaminate molecule, such as one of the molecules 28, enter the tube 20 from the electronic enclosure 10 and describe a random path through the tube 20. Typically a molecule will strike an inner surface of the tube 20, where it will adhere, remaining at rest for a short period of time. During this time that the molecule 28 adheres to the inner wall an alpha particle 27 which collides with such a molecule 28 will typically result in the molecule 28 being polymerized. Such a polymerization of the contaminant molecules results in their forming a film 30 upon the inner wall of the tube 20. Thus, it can be seen that the contaminant molecules 28 are immobilized within the film 30 and are thus prevented from escaping from the enclosure 10 into the surrounding volume of the spacecraft. The molecules 28 are thus also prevented from being eventually deposited upon the outer, heat sensitive, surfaces of the spacecraft.

As can be seen in FIG. 2, the tube 20 may be disposed in a coiled or a serpentine fashion in order to increase the probability that an outgassing molecule which is traversing the inner region of the tube 20 will encounter an inner surface of the tube where it will be polymerized by a impinging alpha particle 27.

Figure 4:
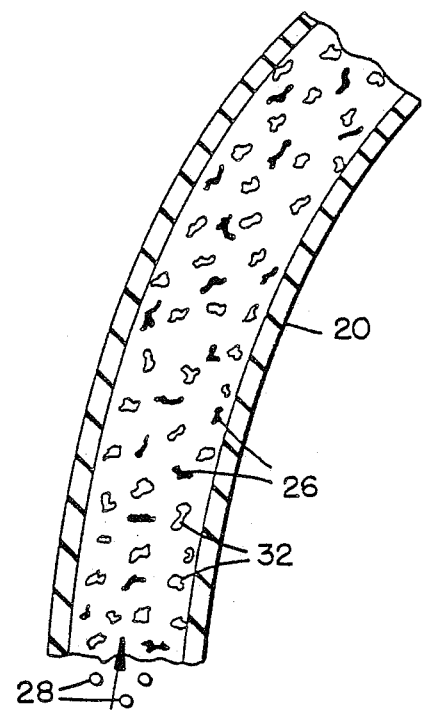
FIG. 4 is a cross-sectional view of an electronic enclosure exhaust tube constructed in accordance with another embodiment of the invention.

Referring now to FIG. 4, there is shown a further embodiment of the invention wherein an exhaust tube 32 is comprised of internally disposed porous material having a plurality of small inner cavities 32. This porous material contains the alpha particle emitting coating 26 distributed therein. The porous material is selected to be sufficiently porous such that the air exhausted during the ascent of the spacecraft is enabled to escape through the material relatively unimpeded, while yet providing for a higher probability that an outgassing molecule 28 will encounter an alpha particle 27 during its passage through the tube 30.

As may be realized, a number of alternate exhaust path shapes and designs may be devised by those skilled in the art. It should further be realized that the use of the invention is not limited to use with spacecraft or to enclosures containing electronic devices. The use of the invention may be advantageously employed in any application wherein it is desired to prevent the escape of a molecular species from an enclosed area into a surrounding area. Thus, the embodiments shown herein are not meant to limit the invention to those embodiments, the invention being limited instead only by the appended claims.

What is claimed is:

1. A molecular contaminate entrapment apparatus comprising:

means for exhausting substantially all of a gas, including molecular contaminates, from an enclosure, said means for exhausting including an exhaust path having inner surfaces and at least one source of ionizing radiation disposed within said exhaust path and upon said inner surfaces thereof, said at least one source being operable for polymerizing a molecular contaminate traversing said exhaust path such that the molecular contaminate is permanently immobilized upon said inner surfaces of said exhaust path.

2. The apparatus as defined in claim 1 wherein said means for exhausting comprises a hollow tubular member and said exhaust path comprises the inner volume of said tubular member.

3. The apparatus as defined in claim 2 wherein said ionizing radiation is alpha particle radiation.

4. The apparatus as defined in claim 3 wherein said source of ionizing radiation is a layer of alpha particle emitting material disposed along an inner surface of said tubular member.

5. The apparatus of claim 1 wherein said means for exhausting comprises a tubular member comprising an internally disposed porous material having a plurality of cavities therein, and wherein said source of ionizing radiation is distributed throughout said cavities.

6. A method of preventing the escape of molecular contaminates from an enclosure, comprising the steps of:

providing an enclosed exhaust path from the enclosure, the enclosure containing a gas and also material which is capable of outgassing molecular contaminates when the material is exposed to a vacuum;

providing a source of ionizing radiation upon an inner surface of the exhaust path;

reducing the ambient gas pressure surrounding the enclosure and exhausting substantially all of the gas within the enclosure through the exhaust path; and irradiating with the source of ionizing radiation any outgassed contaminate molecules which traverse the exhaust path whereby the contaminate molecules are polymerized into a film which permanently adheres to the inner surface of the exhaust path.

7. The method of claim 6 wherein the source of ionizing radiation is provided as regions of material operable for emitting alpha particles.

8. The method of claim 7 wherein the exhaust path is provided by a substantially hollow tubular member.

9. The method of claim 7 wherein the exhaust path is provided by a tubular member which comprises an internally disposed porous material.

10. In an enclosure for use within a spacecraft, means for exhausting a gas within the enclosure during an initial ascent of the spacecraft and for preventing the escape of molecular contaminates to a region surrounding said enclosure after the ascent of the spacecraft, said exhausting means comprising an elongated tubular member communicating at a first end with an internal volume of said enclosure and at a second end with the region surrounding said enclosure, said tubular member comprising an exhaust path for said enclosure, said exhaust path including a source or sources of alpha particle radiation disposed within said exhaust path, said source or sources of alpha particle radiation being disposed for irradiating any molecular contaminates which traverse said exhaust path such that the molecular contaminates are polymerized and are permanently immobilized within said exhaust path.

11. An enclosure as set forth in claim 10 wherein said tubular member is substantially hollow from said first end to said second end.

12. An enclosure as set forth in claim 10 wherein said tubular member comprises an internally disposed porous material and wherein said sources of alpha particle radiation are distributed within said porous material.

* * * * *